US011349786B2

(12) United States Patent
Cole et al.

(10) Patent No.: US 11,349,786 B2
(45) Date of Patent: *May 31, 2022

(54) INSTANT MESSAGING COMMUNICATION SYSTEM AND METHOD

(71) Applicant: Microsoft Technology Licensing, LLC, Redmond, WA (US)

(72) Inventors: Richard James Cole, Woodinville, WA (US); Stephanie Robesky, London (GB); Benjamin Gareth Dove, London (GB); Natasha Sopieva, St. Albans (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,297

(22) Filed: Feb. 4, 2021

(65) Prior Publication Data

US 2021/0160199 A1 May 27, 2021

Related U.S. Application Data

(63) Continuation of application No. 16/385,938, filed on Apr. 16, 2019, now Pat. No. 10,938,754, which is a continuation of application No. 15/279,151, filed on Sep. 28, 2016, now Pat. No. 10,291,558, which is a continuation of application No. 14/618,472, filed on Feb. 10, 2015, now Pat. No. 9,483,277, which is a continuation of application No. 13/173,644, filed on Jun. 30, 2011, now Pat. No. 8,984,420, which is a
(Continued)

(30) Foreign Application Priority Data

Jul. 3, 2007 (GB) ...................... 0712880

(51) Int. Cl.
*H04L 51/04* (2022.01)
*G06F 9/4401* (2018.01)
*H04L 51/18* (2022.01)

(52) U.S. Cl.
CPC ............ *H04L 51/04* (2013.01); *G06F 9/4408* (2013.01); *H04L 51/18* (2013.01)

(58) Field of Classification Search
CPC ........ H04L 51/04; H04L 51/18; G06F 9/4408
See application file for complete search history.

(56) References Cited

U.S. PATENT DOCUMENTS

| 7,685,204 | B2 * | 3/2010 | Rogers | ................. H04L 67/325 707/770 |
| 8,090,799 | B2 * | 1/2012 | Keeler | ............... G06Q 30/0241 709/218 |
| 2004/0179038 | A1 * | 9/2004 | Blattner | ................ H04L 51/046 715/751 |

* cited by examiner

*Primary Examiner* — Cao H Nguyen
(74) *Attorney, Agent, or Firm* — Schwegman Lundberg & Woessner, P.A.

(57) ABSTRACT

Systems and methods for delivering media files in communication sessions are disclosed. User interfaces are displayed on first and second client devices. A media file is selected at the first client device and a representation of the media file is transmitted to the second client device. The representation is selectable within a sent message region of the user interface on the second client device. In response to selecting the representation of the media file, an embedded viewer is launched within the sent message region of the user interface of the second client device that includes embedded selectable controls which, when activated, control viewing or playback of the media file within the user interface.

20 Claims, 11 Drawing Sheets

Related U.S. Application Data continuation of application No. 12/004,106, filed on Dec. 19, 2007, now Pat. No. 7,996,775.

INSTANT MESSAGING COMMUNICATION SYSTEM AND METHOD

PRIORITY

This application is a continuation of and claims priority to U.S. patent application Ser. No. 16/385,938, titled "Instant Messaging Communication System and Method" and filed Apr. 16, 2019, which application is a continuation of and claims priority to U.S. Pat. No. 10,291,558, titled "Instant Messaging Communication System and Method" and filed Sep. 28, 2016, which is a continuation of U.S. Pat. No. 9,483,277, titled "Instant Messaging Communication System and Method" and filed Feb. 10, 2015 which is a continuation of U.S. Pat. No. 8,984,420, titled "Instant Messaging Communication System and Method" and filed Jun. 30, 2011, which is a continuation of U.S. Pat. No. 7,996,775, titled "Instant Messaging Communication System and Method" and filed Dec. 19, 2007, which in turn priority to 35 U.S.C. § 119 or 365 to Great Britain, Application No. 0712880.4, filed Jul. 3, 2007, the entire teachings of the above applications are incorporated herein by reference.

TECHNICAL FIELD

This invention relates to an instant messaging communication system and method.

BACKGROUND

Instant messaging ("IM") is a popular form of computer-based communication in which text-based messages are exchanged between users in real-time. To use an instant messaging system, user terminals of the users must be connected to a communications network, such as the internet, and an instant messaging client application must be executed on the user terminal. The client application allows a user to initiate an instant messaging conversation with a remote user, by establishing a connection over the communications network. The user can then type a message and send it to the remote user (by pressing "enter" or actuating a "send" button), and the message is displayed in the user interface of the client of the remote user in near real-time (depending on network delays). The remote user may then subsequently type a reply and send it to the other user. The exchange of messages can continue in this way, in a similar form to face-to-face verbal conversation.

IM therefore has significant advantages over other text-based forms of electronic communication, such as email, in that it is much more interactive and therefore provides a much richer user experience.

IM therefore has significant advantages over other text-based forms of electronic communication, such as email, in that it is much more interactive and therefore provides a much richer user experience.

Furthermore, there is an increasing desire on the part of the user to be able to share content and media. This is exemplified by the large popularity of websites that host videos, photos and audio clips. As well as being able to view this content on websites, the users also wish to discuss them with each other. However, in order do this in an IM conversation, the user must visit the website page displaying the content, copy the website address (the uniform resource locator, "URL"), and paste this into the IM client. This address is then sent as text to the remote user, who can use a pointing device to click on the address, which executes a web-browser program that displays the webpage. This is clearly an inefficient way of sharing and discussing multimedia content in an IM conversation.

SUMMARY

In an example, a method for delivering media files in a communication session between a plurality of participants, comprises: causing display of a first user interface on a first client device of a first participant of the communication session, the first user interface comprising a message composition region defined within the first user interface for receiving input to compose messages for transmission in the communication session; causing display of a second user interface on a second client device of a second participant of the communication session, the second user interface comprising a sent message region defined for displaying messages within the second user interface previously transmitted by participants of the communication session; receiving a selection of a media ile at the first client device; inserting a representation of the selected media file into the message composition region, the representation associated with a network address of the selected media file; transmitting the representation of the selected media file to the second client device of the second participant of the communication session; causing display of the transmitted representation of the selected media file in the sent message region of the second user interface, wherein the displayed representation of the selected media file is selectable within the sent message region and is embedded with a control which, when invoked, activates the selected media file for viewing or playback within the sent message region of the second user interface; and in response to activating the selected media file within the sent message region, launching a viewer embedded within the sent message region of the second user interface, the embedded viewer comprising embedded selectable controls which, when activated, control viewing or playback of the media file within the second user interface.

In another example, a system for delivering media files in a communication session between a plurality of participants, comprises: one or more hardware processors; one or more memories, storing instructions, which when executed, cause the one or more hardware processors to perform operations comprising: causing display of a first user interface on a first client device of a first participant of the communication session, the first user interface comprising a message composition region defined within the first user interface for receiving input to compose messages for transmission in the communication session; causing display of a second user interface on a second client device of a second participant of the communication session, the second user interface comprising a sent message region defined for displaying messages within the second user interface previously transmitted by participants of the communication session; receiving a selection of a media file at the first client device; inserting a representation of the selected media file into the message composition region, the representation associated with a network address of the selected media file; transmitting the representation of the selected media file to the second client device of the second participant of the communication session; causing display of the transmitted representation of the selected media file in the sent message region of the second user interface, wherein the displayed representation of the selected media file is selectable within the sent message region and is embedded with a control which, when invoked, activates the selected media file for viewing or playback within the sent message region of the second user interface; and in response to activating the selected media file within the sent message region, launching a viewer embedded within the sent message region of the second user interface, the embedded viewer comprising embedded selectable controls which, when activated, control viewing or playback of the media file within the second user interface.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
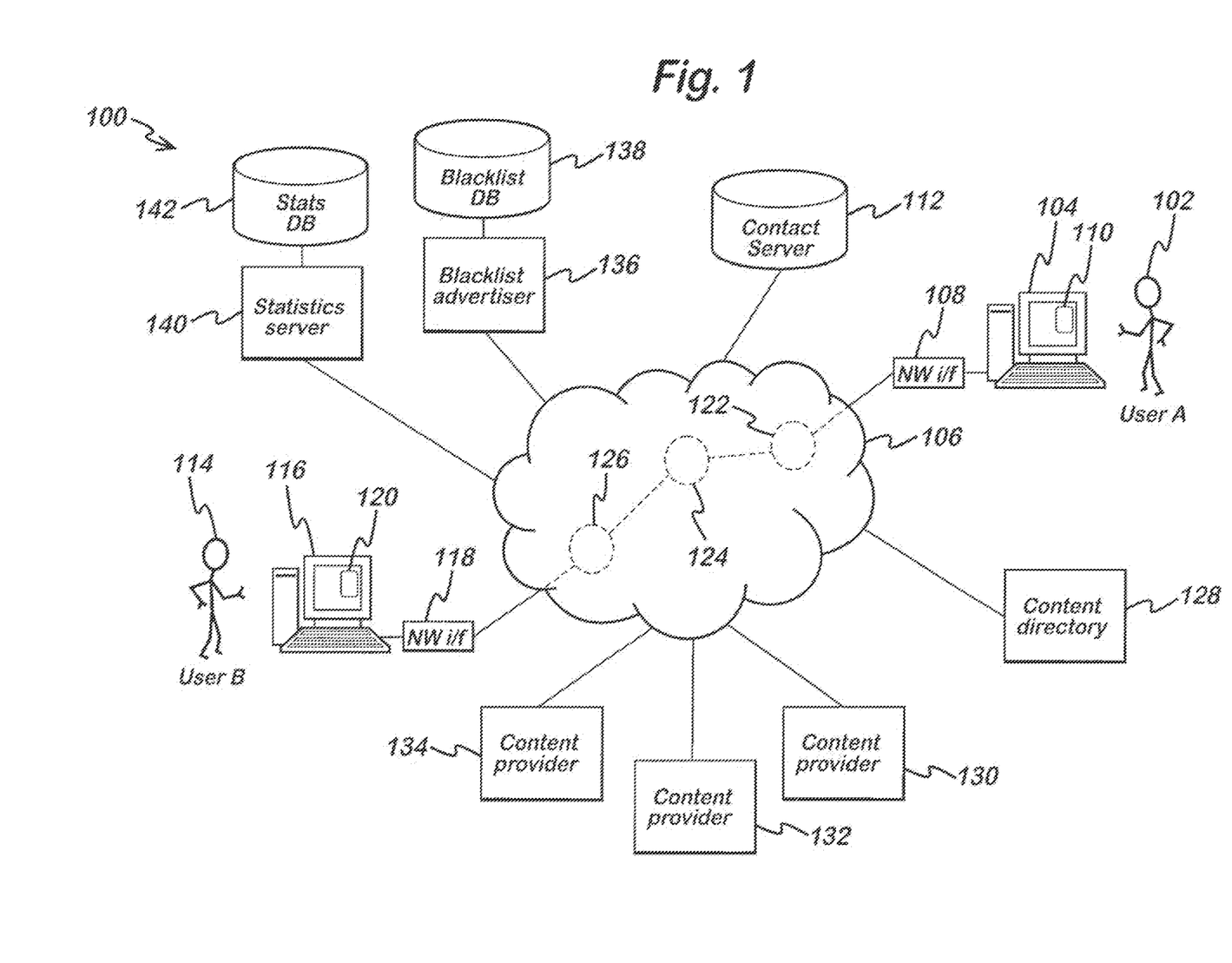
FIG. 1 shows an instant messaging communication system.

Reference is first made to FIG. 1, which illustrates an IM communication system 100. A first user of the IM communication system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user terminal is arranged to receive information from and output information to a user of the device. In a preferred embodiment of the invention the user device comprises a display such as a screen and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a client 110, provided by an IM software provider. The client 110 is a software program executed on a local processor in the user terminal 104.

Figure 2:
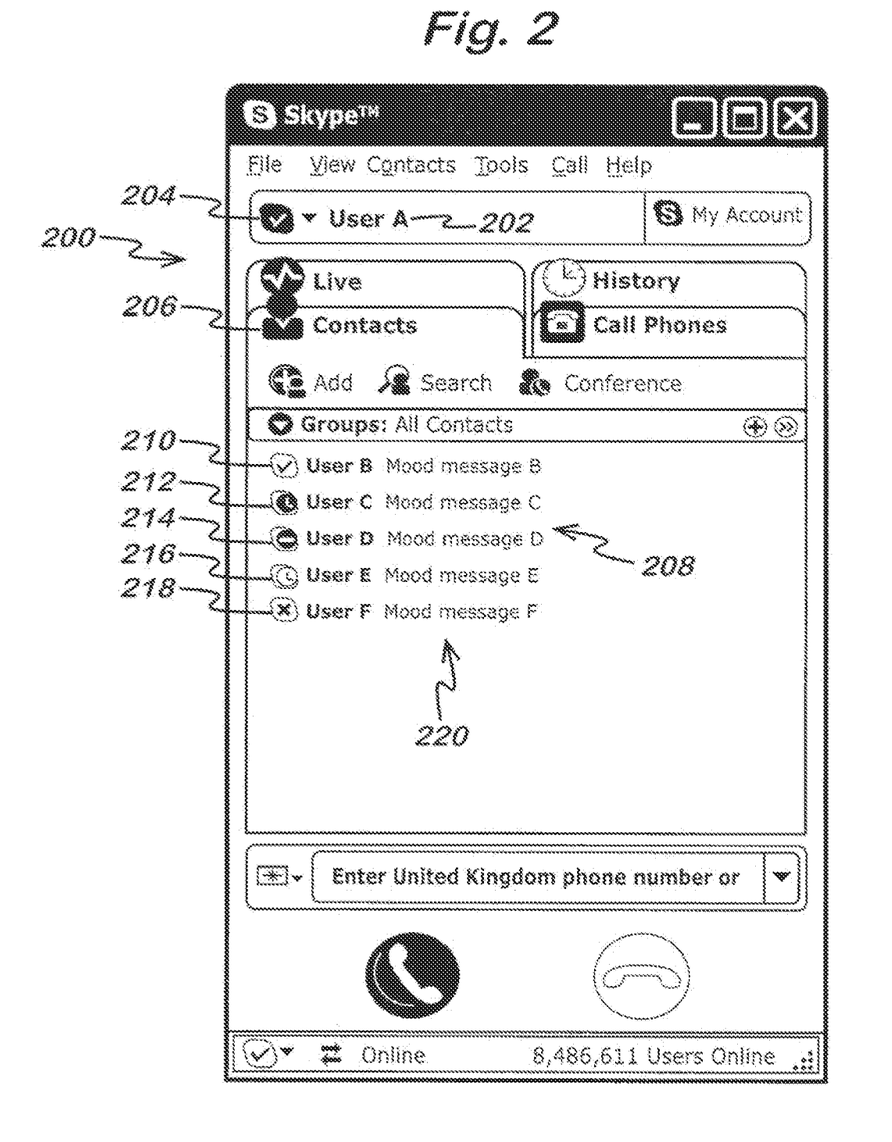
FIG. 2 shows a user interface for an instant messaging communication client.

An example of a user interface 200 of the client 110 executed on the user terminal 104 of User A 102 is shown illustrated in FIG. 2. The client user interface 200 displays the username 202 of User A 102 in the IM system, and User A can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the IM system (User B to F) are shown listed in contact list 208. Each of these contacts have authorised the user of the client 106 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included. Next to the names of the contacts in contact list 208 are the mood messages 220 of the contacts.

The contact list for the users (e.g. the contact list 208 for User A) is stored in a contact server 112 shown in FIG. 1. When the client 110 first logs into the IM system the contact server 112 is contacted, and the contact list is downloaded to the user terminal 104. This allows the user to log into the IM system from any terminal and still access the same contact list. The contact server is also used to store the user's own mood message (e.g. the mood message of User A 102) and a picture selected to represent the user (known as an avatar). This information can be downloaded to the client 110, and allows this information to be consistent for the user when logging on from different terminals. The client 110 also periodically communicates with the contact server 112 in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the network 106. Similarly, the current mood message for each of the contacts, as well as a picture (avatar) that has been chosen to represent the contact, are also retrieved by the client 110 directly from the respective clients of each of the contacts over the network.

Also connected to network 106 is at least one other user of the IM system 100. For example, FIG. 1 illustrates User B 114 operating a user terminal 116 and connected to the network 106 via a network interface 118. User terminal 116 executes client software 120 similar to client 110 executed on the user terminal 104 of User A 102. Note that, in practice, there may be a very large number of further users connected to the IM system, but these are not illustrated in FIG. 1 for clarity.

In preferred embodiments, the clients of the IM system 100 communicate using a peer-to-peer ("P2P") topology built on proprietary protocols. To access the peer-to-peer system, the user must execute client software provided by P2P software provider on their user terminal, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on exchange of one or more digital certificates (or user identity certificates, "UIC") to acquire access to the P2P system. The exchange of the digital certificates between users provides proof of the user's identity and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019. However, it will also be apparent that the IM system and method described herein can also use non-P2P communication systems.

IM conversations to a user in the contact list 208 shown in FIG. 2 may be initiated by the user selecting the contact and clicking on a "chat" button using a pointing device such as a mouse. Referring again to FIG. 1, in the preferred embodiment of a P2P system, the route over the Internet 106 between the initiating user and the user being contacted is determined by the peer-to-peer system without the use of servers. In FIG. 1, an illustrative route is shown between the User A (102) and User B (114), via other peers (122, 124, 126). It will be understood that this route is merely an example, and that the call may be routed via fewer or more peers.

Figure 3:
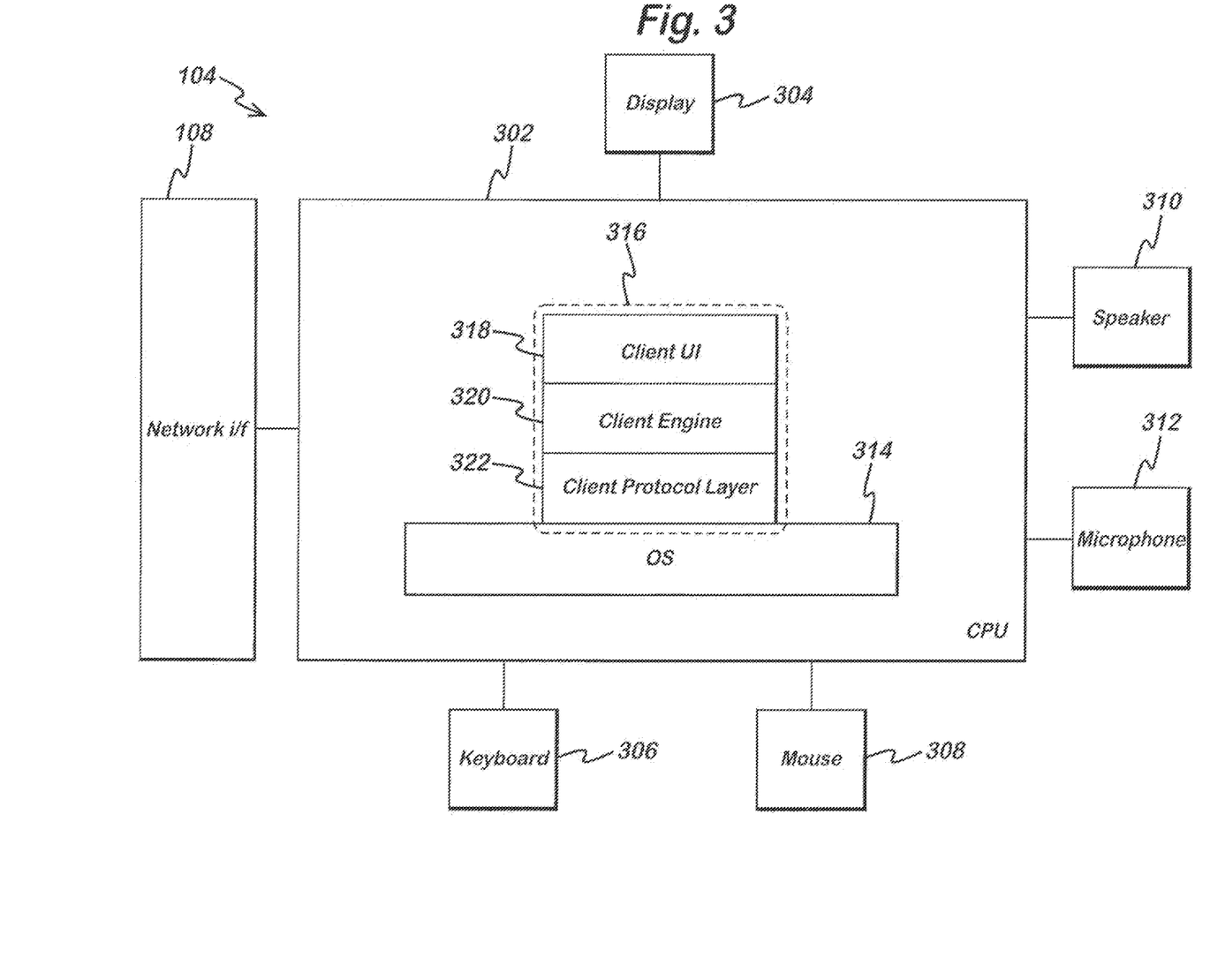
FIG. 3 shows a detailed view of a user terminal on which is executed an IM client.

FIG. 3 illustrates a detailed view of the user terminal (104) on which is executed client 110. The user terminal 104 comprises a central processing unit ("CPU") 302, to which is connected a display 304 such as a screen, an input device such as a keyboard 306, a pointing device such as a mouse 308, and, optionally, a speaker 310 and a microphone 312.

FIG. 3 also illustrates an operating system ("OS") 314 executed on the CPU 302. Running on top of the OS 314 is a software stack 316 for the client 110. The software stack shows a protocol layer 322, a client engine layer 320 and a client user interface ("UI") layer 318. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the IM system. Processes requiring higher level processing are passed to the client engine layer 320, which handles the processing required for the user to transmit and receive messages over the IM system. The client engine 320 also communicates with the client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

Figure 4A:
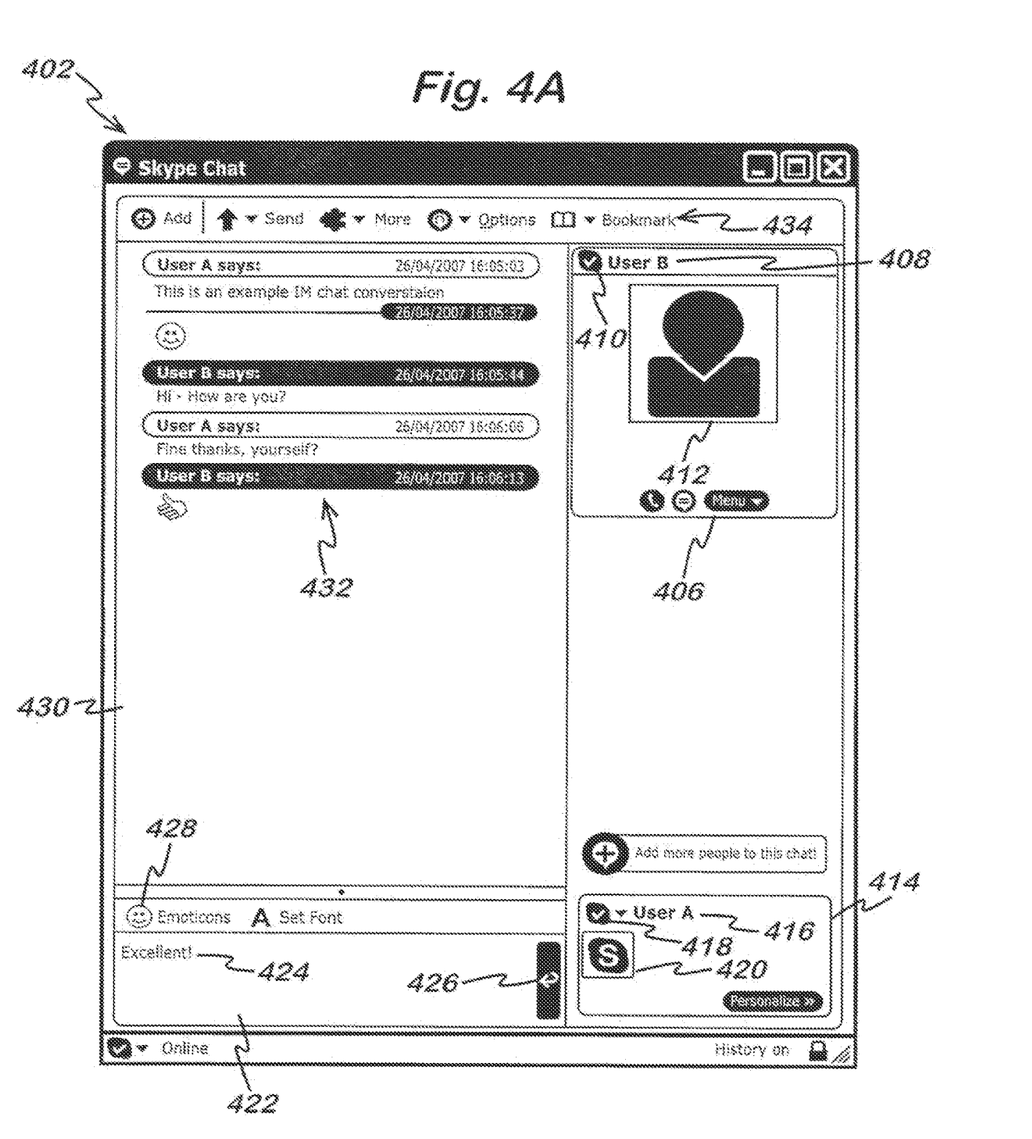
FIG. 4A shows an IM user interface for User A.
Figure 4B:
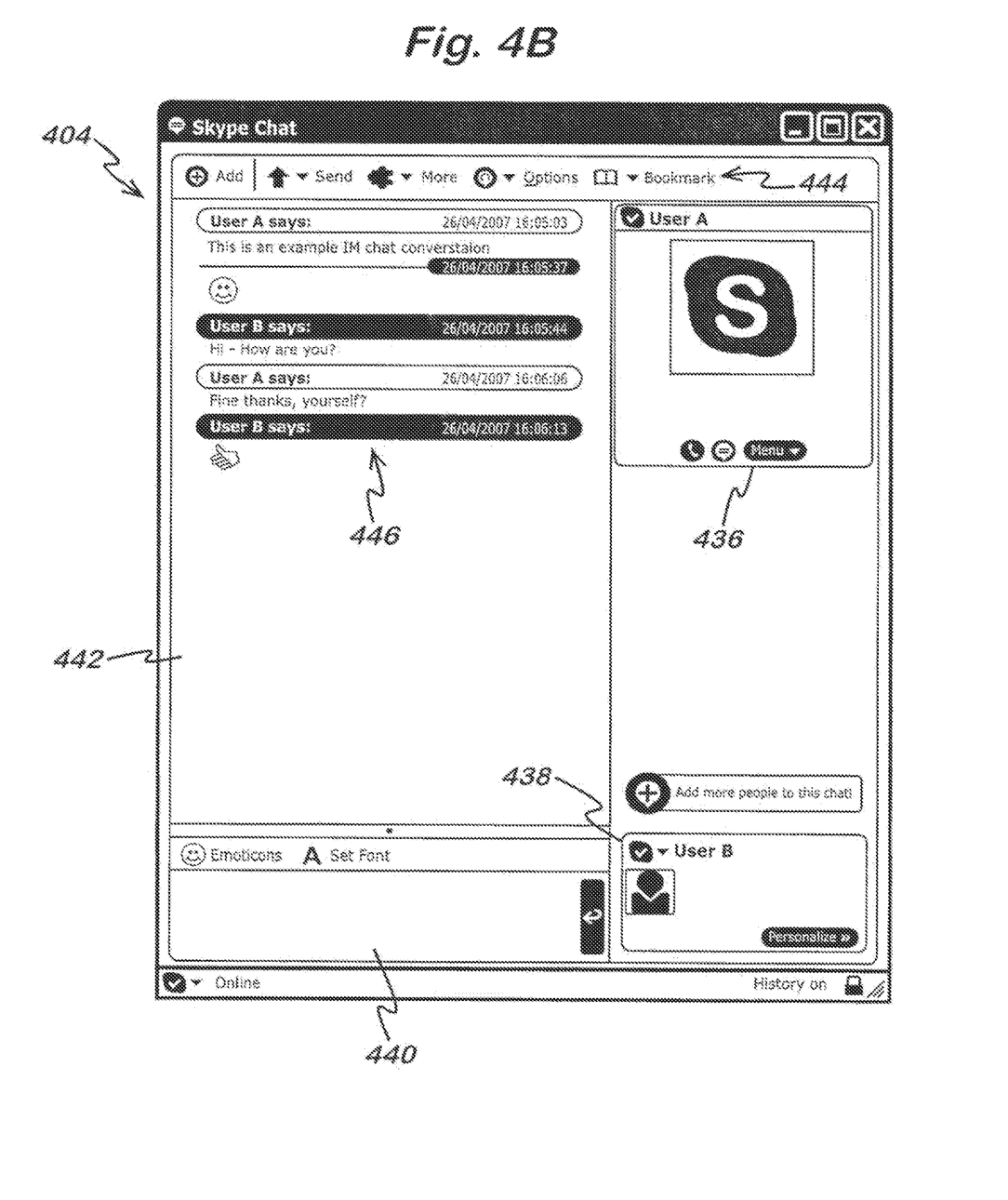
FIG. 4B shows an IM user interface for User B.

Reference is now made to FIGS. 4A and 4B, which illustrate known user interfaces for an IM conversation. In this example, User A 102 has initiated an IM conversation with User B 114. FIG. 4A shows the user interface 402 displayed to User A 102 on terminal 104, and FIG. 4B shows the user interface 404 displayed to User B 114 on terminal 116.

The user interface 402 displayed to User A 102 comprises a contact card 406 showing details of the remote user with which User A 102 is communicating (in this example User B 114). Note that more than two users may be communicating in an IM chat, and in this instance multiple contact cards are shown. The contact card 406 displays the name 408, presence state 410 and avatar for User B 114.

A smaller contact card 414 is also shown at the bottom of the user interface 402, which displays details about User A 102, thereby indicating to User A 102 how he will be perceived by other users in the IM chat. The smaller contact card 414 displays the name 416, presence state 418 and avatar 420 for User A 102.

The user interface 402 displayed to User A 102 further comprises a message composition region 422 in which User A 102 can type messages (using keyboard 306) to be sent to User B 114. The message composition region 422 shows an example message 424 that has been typed but not yet sent to User B 114. The example message 424 can be sent by pressing the "enter" key on the keyboard, or by selecting a send button 426. The message composition region 422 also comprises a drop down menu for selecting emoticons 428 for inclusion in the message being prepared in the message composition region.

Messages that have been sent by the users in the IM conversation are shown in a sent message region 430. The sent message region 430 displays a sequence of messages 432 that have been sent by User A 102 or User B 114. All the messages that are sent by any participants to the IM conversation are shown in the sent message region 430. The messages sent comprise both text and emoticons, and indicate both the sender of the message and the time that they were sent.

The user interface 402 also comprises a toolbar 434 for controlling options related to the IM conversation. These options are out of the scope of this description.

The user interface 404 displayed to User B 114 displays similar information to the user interface 402. The user interface 404 shows a contact card 436, a smaller contact card 438, a message composition region 440, a sent message region 442, and a toolbar 444. Note that because user interface 404 is displayed to User B 114, contact card 436 shows User A's details and the smaller contact card 438 shows User B's details. The messages 446 shown in the sent message region 442 are the same as those shown to User A 102 in user interface 402. Note that User B 114 cannot yet see the message 424 being prepared by User A 102 in the message composition region 422, as it has not been sent. Once it has been sent, it will be visible to User B 114 in the sent message region 442.

Figure 5:
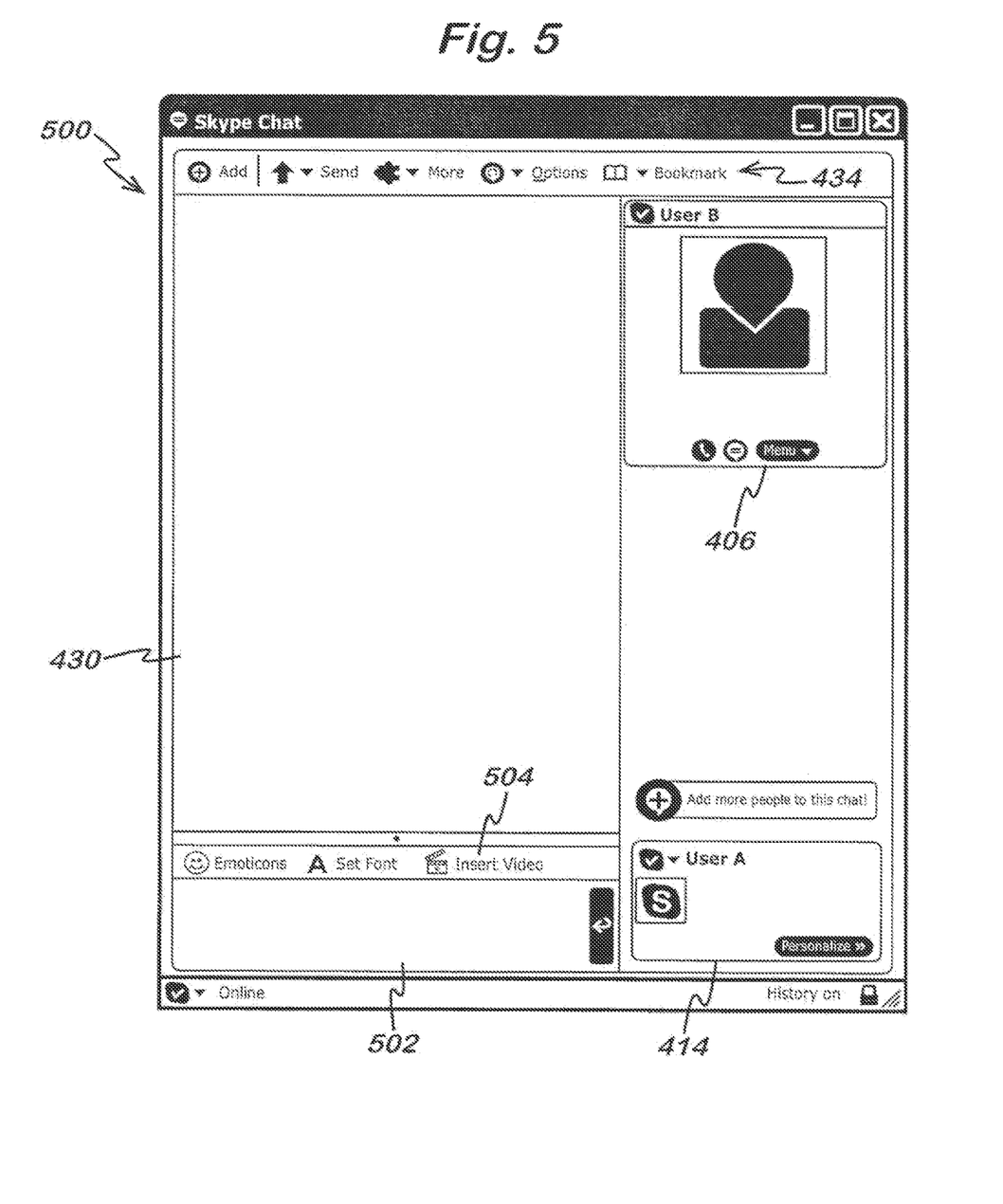
FIG. 5 shows an IM user interface comprising an insert video button.

Reference is now made to FIG. 5, which illustrates an IM user interface 500 according to an embodiment of the invention. The user interface 500 shown in FIG. 5 is displayed to User A 102 on terminal 104. In FIG. 5, the user interface 500 displays a similar UI to that shown in FIG. 4A. In particular, the user interface 500 comprises a contact card 406, small contact card 414, sent message region 430 and toolbar 434 that are the same as those shown on FIG. 4A and described hereinbefore. However, in this embodiment, the message composition region 502 comprises an "insert video" button 504.

The purpose of the "insert video" button 504 is to initiate a process by which a user can insert multimedia content into an IM chat message. In the case of the embodiment shown in FIG. 5, the multimedia content to be inserted is a video. However, it will be apparent that other content could be included, such as still images or audio.

If the user actuates the "insert video" button 504 using the pointing device 308, then the process for inserting a video into an IM conversation is started. Upon selecting the button 504 to add a video to the IM message, the user is presented with the UI 600 illustrated in FIG. 6. The UI 600 can be considered to comprise two separate elements. The first element is the frame of the UI 600, comprising tabs (602, 604, 606), navigation buttons 608, search field 610, selection area 612 and control buttons (614, 616). The second element is a pane 618 which shows different information for each of the tabs (602, 604, 606). Specifically, pane 618 displays representations of the available videos.

Figure 6:
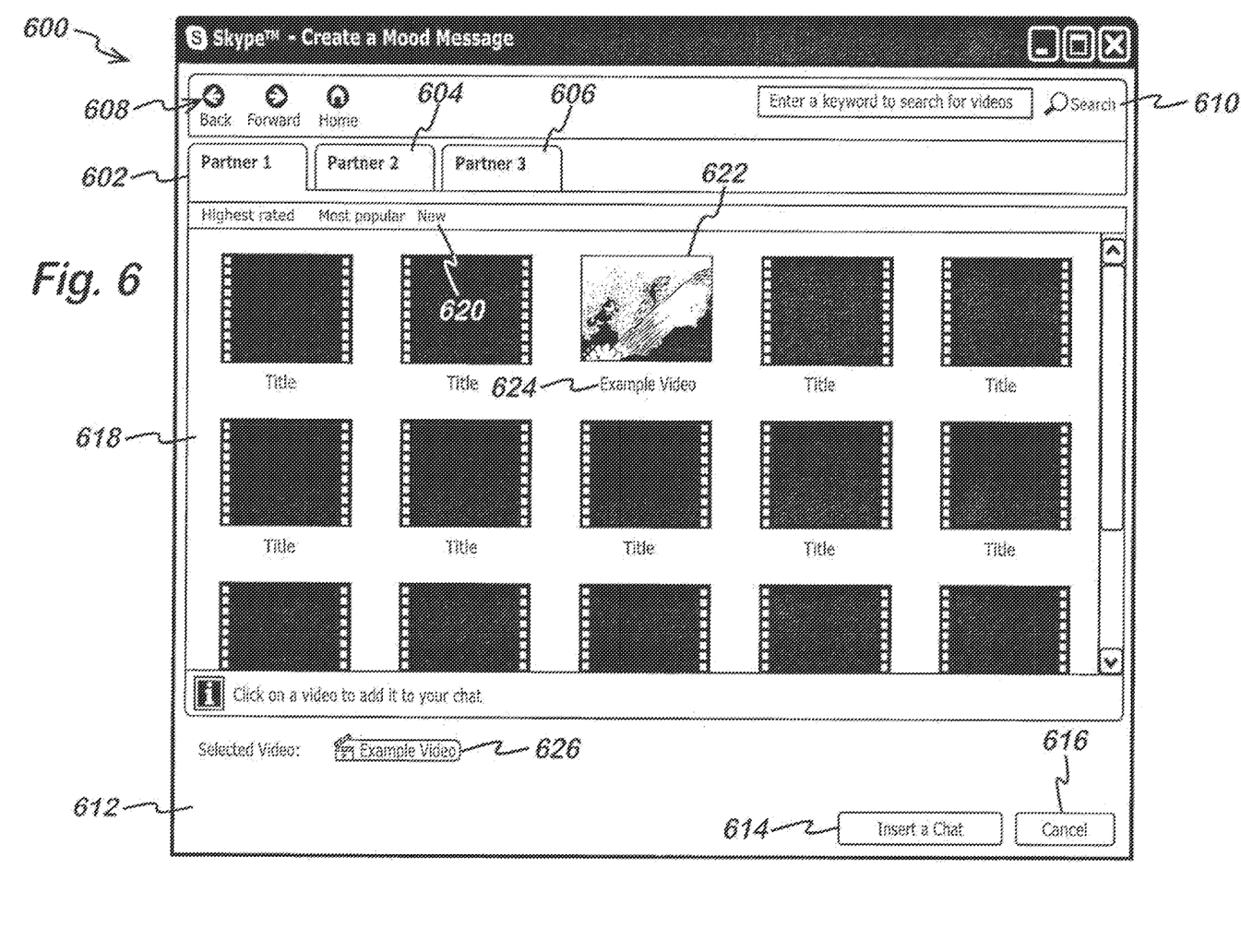
FIG. 6 shows a directory of available videos.

The information for the above-two elements in UI 600 is fetched from different sources, as will be described with reference to FIG. 1. Firstly, the information relating to the frame of the UI is fetched from a content directory 128. The content directory 128 is shown in FIG. 1 connected to the network 106. The client 110 is arranged to communicate with the content directory 128 and retrieve the information to allow the client 110 to present the UI 600 to the user. In particular, the client 110 needs to fetch the information regarding the tabs (602, 604, 606). Specifically, information is needed on the number of tabs (three are shown in FIG. 6, but more or less tabs may be shown—for example if there is only one content provider then no distinct tabs are required), the titles of the tabs, and the address of where the information to populate pane 618 for each tab is located. Preferably, this address is in the form of a webpage uniform resource locator ("URL").

Once the information regarding the frame of UI 600 has been retrieved from the content directory 128, the information for pane 618 is retrieved from a content provider. FIG. 1 illustrates three separate content providers (130, 132, 134) connected to network 106. In this exemplary embodiment, these three content providers (130, 132, 134) respectively provide the information displayed for the three tabs (602, 604, 606) of UI 600. The content providers (130, 132, 134) provide the information that populates pane 618 and also provide the actual video data. Preferably, the content providers are third parties, and separate from the IM software provider. Note that the media content that is made available by the content provider can be provided by individual users uploading the media to the content provider.

In the example shown in FIG. 6 the UI 600 shows the content for tab 602, labelled "Partner 1". The client uses the address obtained from the content directory 128 for tab 602 to access content provider 130 in order to display the information for this tab. More specifically, the address from the content directory 128 is a URL of a webpage provided by the content provider 130, and the client downloads this webpage (in the form of hypertext mark-up language ("HTML")) over the network 106 and displays the webpage in pane 618. If the user uses the pointing device to select a different tab, such as 604 or 606, then the address provided by the content directory for the selected tab is used to fetch the information to be displayed for this tab.

The purpose of the information shown in pane 618 is to provide the user with a selection of videos that are available to be included in an IM message. Pane 618 displays a plurality of thumbnail images (e.g. thumbnail 622) representing each video and a title (e.g. title 624) for each video. The thumbnail image for a video is a small image of a single frame from the video. The thumbnail for each video is generated from the video file itself (e.g. it can be the first frame of the video, or a frame a predetermined time or percentage into the video). Preferably, a list of categories 620 is displayed to allow the user to view a sub-set of the available videos. Furthermore, the user can search the videos by keywords using the search field 610.

Preferably, the content directory 128 is provided by the IM software provider. This allows the IM software provider to present a portal to several content providers (130, 132, 134) that are able to provide videos to the users, thereby avoiding the requirement for the IM software provider to host and/or stream its own videos. The content directory 128 can be updated to add or remove content providers as required.

When UI 600 is displayed on the user terminal 104, the user can use the pointing device to browse the available videos from the different content providers (by using the different tabs 602-606, the categories 620 and the search field 610). When a user sees a video that he is interested in, he clicks the thumbnail to view a preview of the video. In preferred embodiments, when the user selects a video (such as video 622) the pane 618 changes so that an enlarged version of the video is played to the user using an embedded video player. The user can control the playback of the video using controls in the embedded video player. The preview allows the user to decide whether or not to include the selected video in an IM conversation. If the user chooses not to include the video, he can close the preview and select another video from pane 618 to preview.

When the user selects a video in pane 618 (such as video 622), an object 626 representing the selected video is displayed in the selection area 612. The object 626 is in the form of an icon that displays the title 624 of the selected video. In alternative embodiments, the object 626 can represent the video using a different type of icon, using a picture, thumbnail, or using any other suitable type of selectable control. The object 626 is generated by the client 110, and has embedded within it two items of data related to the video. The first item of data embedded in the object is the title of the video, which is displayed as part of the object 626 when it is rendered in the UI. The second item of data is the network address of the video selected by the user. More specifically, a uniform resource identifier ("URI") of the selected video at the content provider (130, 132, 134) is stored as part of the object 626.

Preferably, the object 626 can comprise further data items. For example, a media type field can define the type of media (e.g. video, photo, audio etc.). A content provider identity can be used to identify which content provider the media originated from. A content provider uniform resource identifier ("URI") can provide an address of where further information may be found regarding the partner (e.g. the address of the partner webpage). A thumbnail image for the media can also be stored in the object. Preferably, the thumbnail image is provided by the content provider.

The object 626 shown in the selection area 612 indicates to the user how the video will be represented in the IM chat message. When the user is happy with his selection of a video, he can select the "Insert in Chat" button 614 to proceed with including the video in an IM chat message. Alternatively, the user can select the "Cancel" button to end the process without inserting a video in the IM chat.

Figure 7:
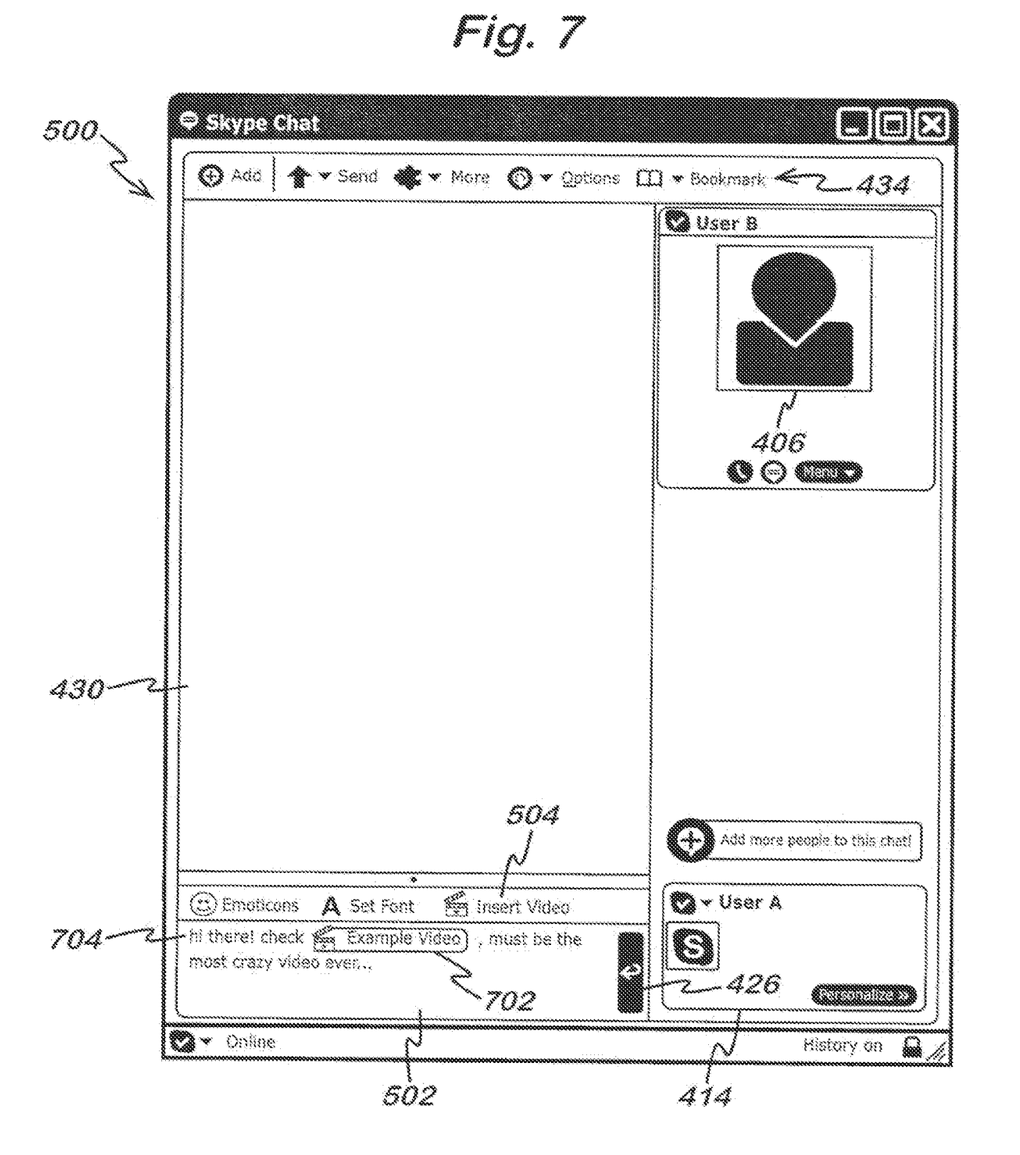
FIG. 7 shows an IM user interface with a video object inserted in a message composition region.

Following the user selecting a video (e.g. video 622) and actuating button 614, the UI 600 is closed, and the control returns to the IM user interface 500, as illustrated in FIG. 7. The object 626 that was shown previewed to the user in FIG. 6 has now been inserted into the message composition region 502, as shown at 702 of FIG. 7.

In an alternative embodiment, the user can also add a video to a chat message without using the video selection UI shown in FIG. 6. For example, the user can copy and paste a URL of a video on a webpage directly into the message composition region 502. The client detects that this URL is linking to a video (or other type of media), and automatically generates the object 702 comprising the URL and video title, and replaces the URL pasted into the message composition region with this object. In some embodiments, the client can also perform a check that the video URL is from an approved partner (e.g. one of the content providers 130, 132, 134).

Referring again to FIG. 7, the object at 702 is handled by the message composition region 502 in the same way as a normal character or an emoticon. This means that the user can type user-readable text (such as shown at 704) around the object 702 simply by placing the cursor either before or after the object 702 and typing using the keyboard. This is an important feature, as it allows the object 702 representing the selected video to be readily and closely incorporated into the subject matter of the message, such that the object 702 becomes part of a sentence prepared by the user. This greatly improves the readability and flow of the message comprising the object 702. The user is also able to remove the object 702 simply by deleting it as if it were a normal character or emoticon.

User A 102 is therefore able to compose a message that incorporates the object 702 representing the selected video (622) in the message composition region 502, and when he is satisfied with the message as a whole he can transmit it to User B 114 by pressing the "enter" key on the keyboard or selecting the send button 426. The message, which contains the object 702 with the embedded video URI, is transmitted over the network 106 (referring to FIG. 1—for example via peers 122, 124 and 126) to the terminal 116 of User B 114. The client 120 executed on the terminal 116 of User B 114 displays the message to User B 114 as described hereinbelow.

Figure 8:
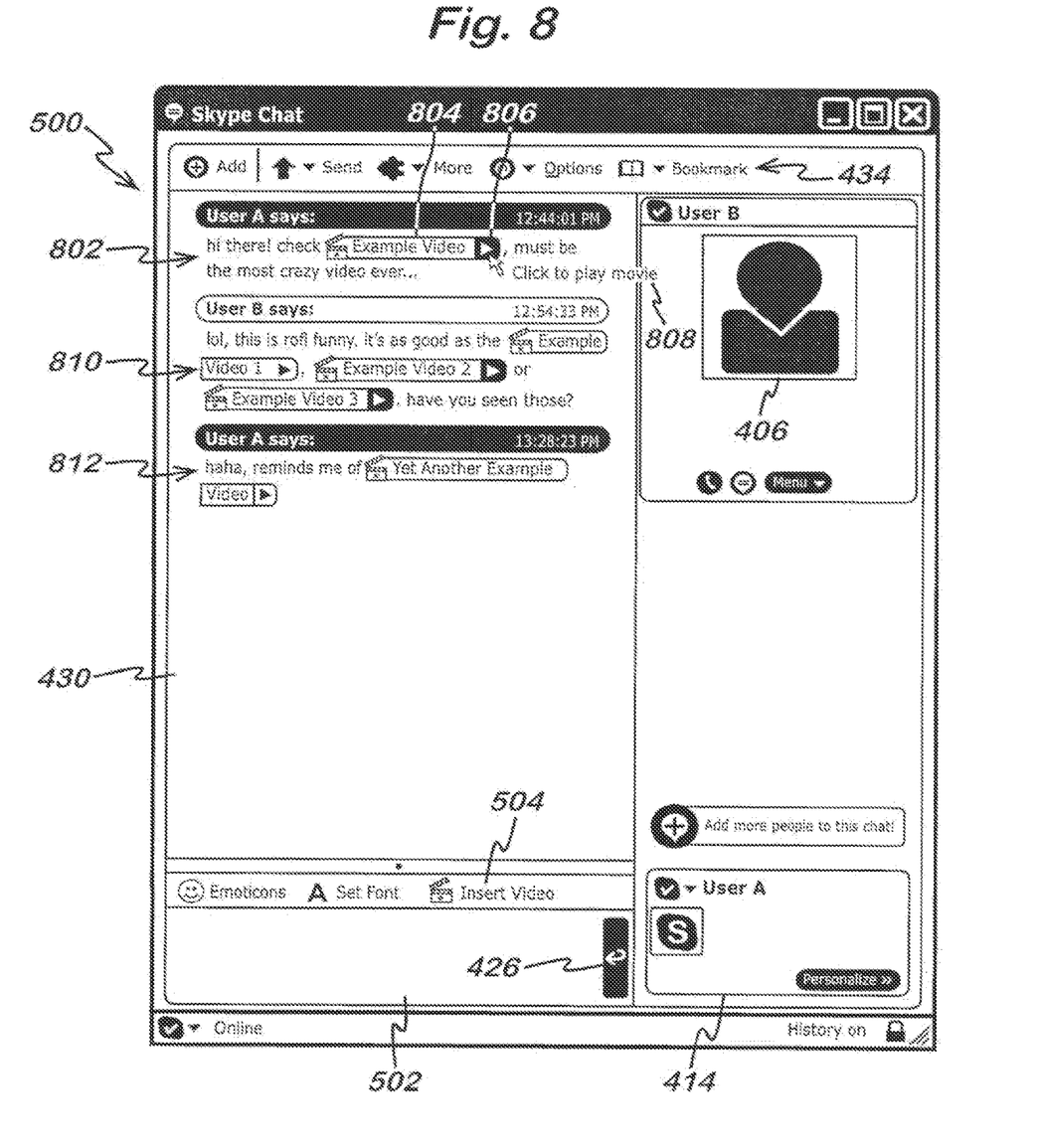
FIG. 8 shows an IM user interface with video objects in a sent message region.

Reference is now made to FIG. 8, which illustrates the IM user interface 500 after User A 102 has sent a message comprising an embedded video object. The IM user interface 500 shown in FIG. 8 illustrates the user interface displayed to User A 102 on terminal 104. User B's user interface is not shown in FIG. 8, but it will be understood that User B 114 is also shown a similar user interface on terminal 116, with the same messages displayed, in a manner similar to that described above with reference to FIGS. 4A and 4B.

The sent message region 430 displays the message 802 that was prepared by User A 102 as shown in FIG. 7. It will be noted that the message comprises both user-readable text and an object 804 representing a video selected by User A 102. The object 804 is slightly different to the object 702 in FIG. 7, in that it now has a play button 806 appended to it. The play button 806 initiates the playback of the video to the user when it is activated using the pointing device. This is indicated to the user with the message 808, which is displayed when the user places the cursor over the play button 806. The play button 806 is hyperlinked using the embedded URI of the selected video 622 at the content provider 130.

FIG. 8 also illustrates a reply from User B 114 to the first message 802. User B's reply message 810 clearly illustrates how embedding the video objects into the text of the message allows for the conversation to flow clearly whilst incorporating multimedia into the IM chat. Reply message 810 also shows how a plurality of videos can be selected and incorporated into a single IM chat message. This is achieved by repeated selection of the "insert video" button 504, each time selecting another video from the directory shown above with reference to FIG. 6. A further reply message 812 from User A 102 further indicates the incorporation of multimedia into the IM conversation flow.

Figure 9:
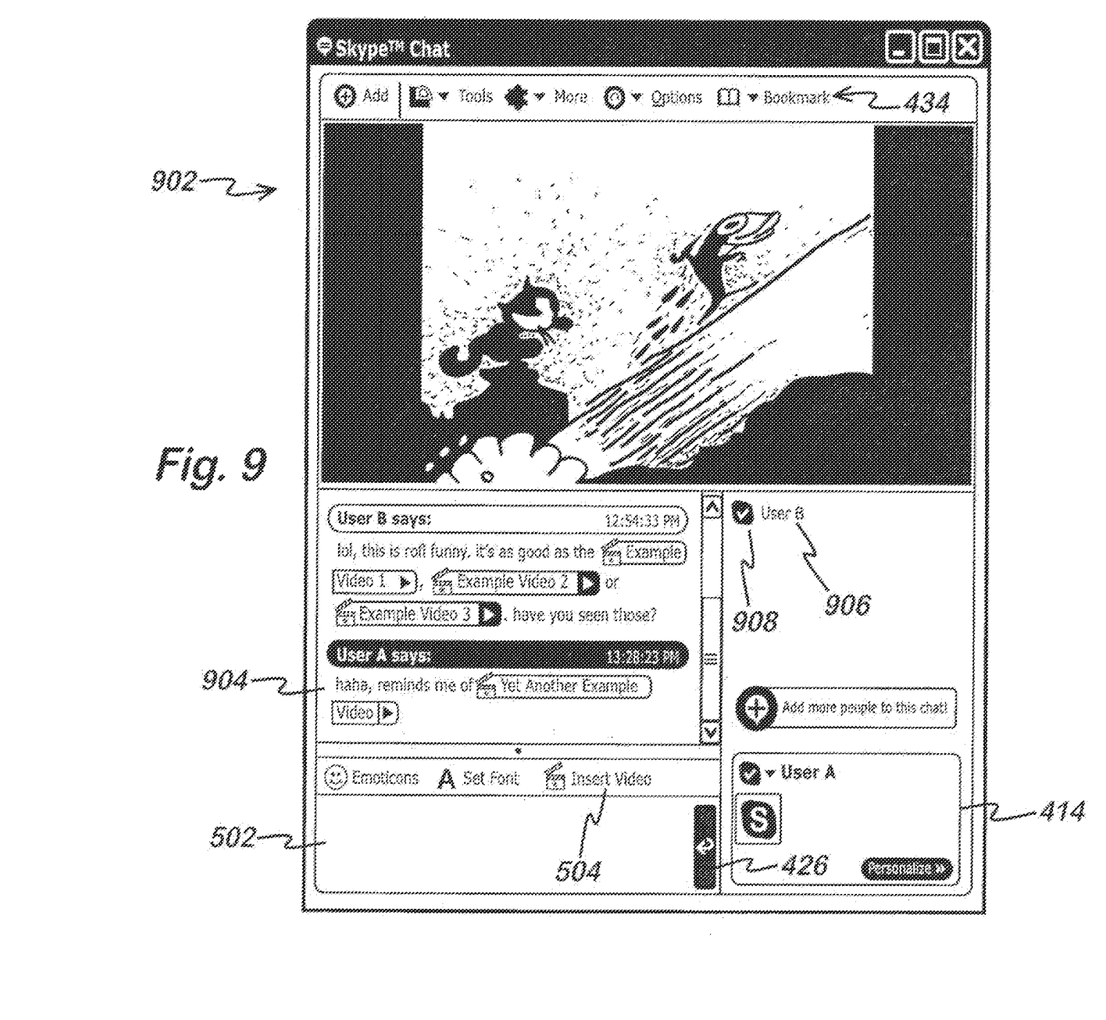
FIG. 9 shows an IM user interface with an embedded video player.

When the user actuates a play button appended to the object representing a video in the sent message region then the video is played to the user, as described with reference to FIG. 9. In the example shown in FIG. 9, User A 102 has actuated the play button 806 for the object 804. Responsive to this, the client 110 executes an embedded video player within the IM user interface as shown in region 902. The client also uses the address (i.e. the URI) of the video embedded in the object 804 to communicate with the content provider 130 over the network 106 and access the video represented by the object 804. The video located at the embedded address is played back to the user from where it is stored at the content provider 130, and the video data is streamed to the user terminal over the network 106.

The embedded video player in region 902 results in the sent message region 904 being reduced in size and the contact card for User B 114 is removed and replaced with a name 906 and presence state 908.

In an alternative embodiment, rather than the video being played in region 902 above the sent message region 904, the video can be played in line with the messages in the sent message region itself.

Figure 10:
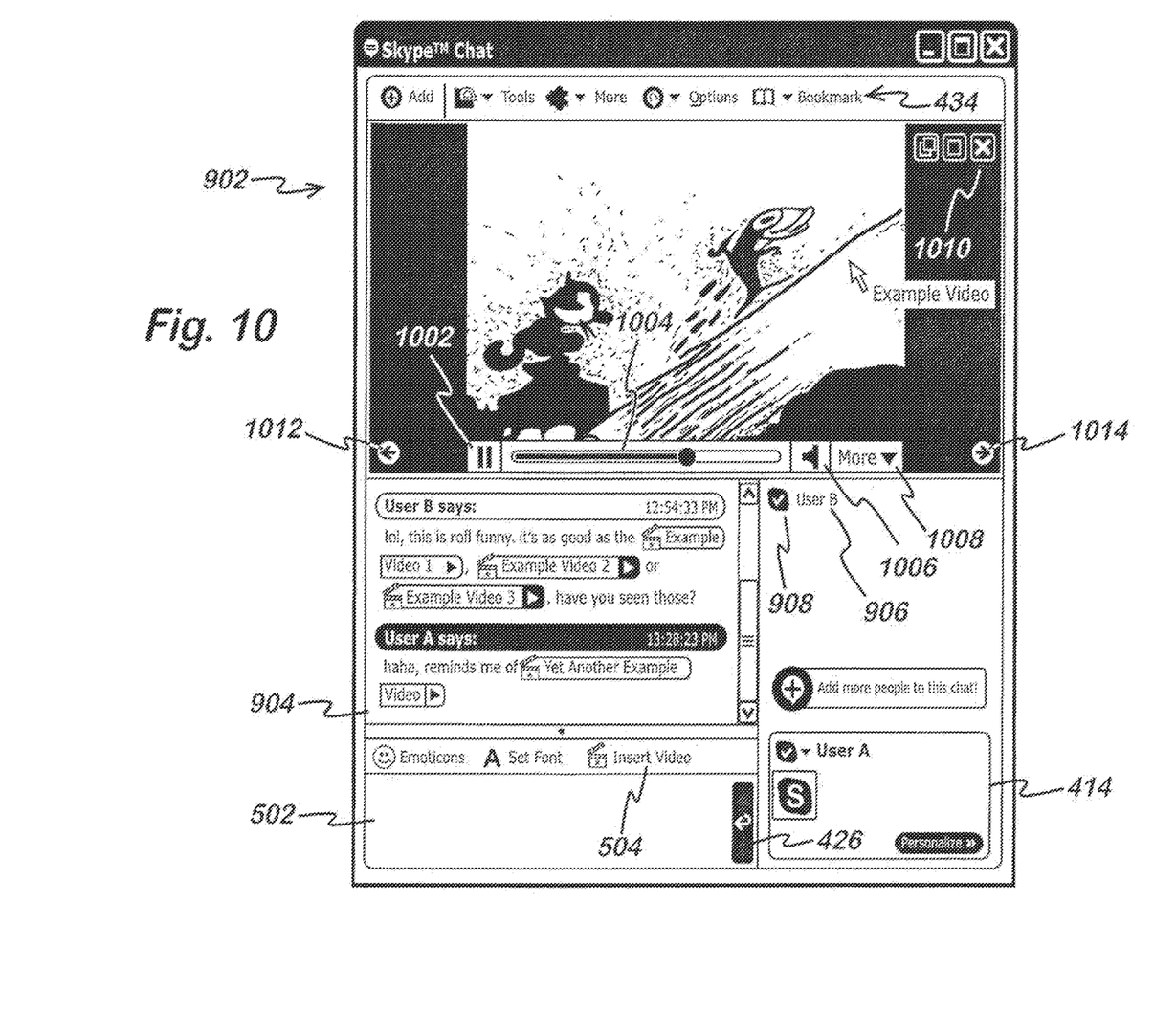
FIG. 10 shows an IM user interface with an embedded video player and controls.

The playback of the video can be controlled by the user by moving the cursor into region 902, as illustrated in FIG. 10. By moving the cursor into region 902, a control bar is displayed to the user at the bottom of the video. The control bar comprises a play/pause button 1002, a progress bar 1004, a sound control button 1006 and a drop-down menu 1008. These controls can be operated by the user using the pointing device. In addition, a set of three buttons 1010 are shown at the top right of the video. These buttons can be used to open the video in a new window, expand the video to full-screen size, or close the video. A back button 1012 and a forward button 1014 are also included to allow the user to move between the different videos that are present in the sent message region 904. For example, in the case of FIG. 10, the video being displayed is the video entitled "Example Video". If the forward button 1014 is actuated, then the video entitled "Example Video 1" (from User B's reply message 810) will be played.

The above-described system therefore permits multimedia items (such as videos) to be inserted into IM chat messages as an integral part of a conversation. The videos can be readily viewed by any party to the conversation within the same UI as the chat messages, thereby further ensuring that the videos become part of the conversation itself and allowing them to be readily discussed by the users.

In preferred embodiments, before a video is displayed to a user, the client (110, 120) will perform a check to ensure that the video address embedded in an object in an IM message does not relate to a video that has been "blacklisted". A video may be blacklisted if, for example, it is found to infringe copyright or contains offensive material. Referring to FIG. 1, a blacklist advertiser 136 is shown connected to network 106, and connected to the blacklist advertiser is a blacklist database 138. If any videos are "blacklisted", then the address of the video is stored in the blacklist DB 138. When a user attempts to view a video by selecting an object representing a video in an IM message, the client sends a message to the blacklist advertiser 136 containing the video address. The blacklist advertiser 136 compares the video address sent by the client with those listed in the blacklist DB 138.

If the video address matches one listed in the blacklist DB 138, then blacklist advertiser 136 sends a message to the client indicating that the video has been blacklisted. In response to this the client does not display the video, but instead displays a notification of the problem. If the video address is not listed in the blacklist DB 138, then the blacklist advertiser 136 sends a message to indicate to the client that the video can be displayed in the embedded video player as shown in FIG. 9 and described hereinbefore.

In addition, referring again to FIG. 1, in preferred embodiments a statistics server 140 is connected to network 106, and connected to the statistics server is a statistics DB 142. The statistics DB 142 is used to store statistics related to the videos that are being used in IM messages by the users of the system. In particular, whenever a video is added to an IM message, a message is sent to the statistics server 140 indicating which video is being included in an IM message. The statistics server 140 processes this message and stores the information in the statistics DB 142. This allows the IM software provider to access information on which videos are the most popular in IM messages. In further embodiments, more detailed information regarding the videos can also be sent to the statistics server 140. For example, this can comprise metadata attached to the content, which describes what the video shows (e.g. for a music video the metadata can contain the type of music, the artist and track title). This information can be used to provide a more accurate description of the media being inserted into IM messages.

While this invention has been particularly shown and described with reference to preferred embodiments, it will be understood to those skilled in the art that various changes in form and detail may be made without departing from the scope of the invention as defined by the appendant claims.

For example, it will be understood by those skilled in the art that still photos or audio clips/recordings could be incorporated into IM messages in a similar manner as the videos in the above-described embodiment. Furthermore, it will also be understood by those skilled in the art that, whilst the above-described embodiment has been illustrated with reference to a peer-to-peer communication system, other types of IM communication system could also be used.

We claim:

1. A method for delivering media files in a communication session between a plurality of participants, the method comprising:

causing display of a first user interface on a first client device of a first participant of the communication session, the first user interface comprising a message composition region defined within the first user interface for receiving input to compose messages for transmission in the communication session;

causing display of a second user interface on a second client device of a second participant of the communication session, the second user interface comprising a sent message region defined for displaying messages within the second user interface previously transmitted by participants of the communication session;

receiving a selection of a media file at the first client device;

inserting a representation of the selected media file into the message composition region, the representation associated with a network address of the selected media file;

transmitting the representation of the selected media file to the second client device of the second participant of the communication session;

causing display of the transmitted representation of the selected media file in the sent message region of the second user interface, wherein the displayed representation of the selected media file is selectable within the sent message region and is embedded with a control which, when invoked, activates the selected media file for viewing or playback within the sent message region of the second user interface; and in response to activating the selected media file within the sent message region, launching a viewer embedded within the sent message region of the second user interface; the embedded viewer comprising embedded selectable controls which, when activated, control viewing or playback of the media file within the second user interface.

2. The method of claim 1, wherein the representation of the media file is a selectable object.

3. The method of claim 2, wherein the selectable object is associated with a title of the media file, and wherein causing display of the transmitted representation comprises causing display of the title of the media file within the sent message region of the second user interface.

4. The method of claim 2, wherein causing display of the transmitted representation comprises causing display of a pictorial representation of the selected media file clickable to activate the selected media file within the sent message region of the second user interface.

5. The method of claim 1, wherein the inserted representation of the selected media file within the message composition region of the first user interface differs from the display of the transmitted representation of the selected media file within the sent message region of the second user interface.

6. The method of claim 1, wherein the selected media file is a video, and wherein the embedded viewer is a video player, and wherein the embedded selectable controls comprise playback controls for the video.

7. The method of claim 1, wherein receiving selection of the media file at the first client device comprises receiving selection of the media file stored at the remote location with respect to the first client device.

8. The method of claim 1, wherein the representation of the media file is a link to the media file clickable to activate the media file within the message composition region of the first user interface.

9. The method of claim 1, further comprising:

in response to the transmitting, causing display of the representation of the selected media file in a sent message region of the first user interface, the representation of the selected media file selectable within the sent message region of the first user interface to active the selected media file within the sent message region of the first user interface.

10. The method of claim 1, wherein transmitting the representation of the media file comprises:

receiving selection of a send command through the first user interface;

packaging the representation of the media file with other contents of the message composition region at the time of receiving the selection of the send command into a packaged message; and transmitting the packaged message to the second client device.

11. The method of claim 1, wherein the representation of the selected media file is displayed and selectable within the message composition region of the first user interface to activate the selected media file within the first user interface.

12. A system for delivering media files in a communication session between a plurality of participants, the system comprising:

one or more hardware processors;

one or more memories, storing instructions, which when executed, cause the one or more hardware processors to perform operations comprising:

causing display of a first user interface on a first client device of a first participant of the communication session, the first user interface comprising a message composition region defined within the first user interface for receiving input to compose messages for transmission in the communication session;

causing display of a second user interface on a second client device of a second participant of the communication session, the second user interface comprising a sent message region defined for displaying messages within the second user interface previously transmitted by participants of the communication session;

receiving a selection of a media file at the first client device;

inserting a representation of the selected media file into the message composition region, the representation associated with a network address of the selected media file;

transmitting the representation of the selected media file to the second client device of the second participant of the communication session;

causing display of the transmitted representation of the selected media file in the sent message region of the second user interface, wherein the displayed representation of the selected media file is selectable within the sent message region and is embedded with a control which, when invoked, activates the selected media file for viewing or playback within the sent message region of the second user interface; and in response to activating the selected media file within the sent message region, launching a viewer embedded within the sent message region of the second user interface, the embedded viewer comprising embedded selectable controls which, when activated, control viewing or playback of the media file within the second user interface.

13. The system of claim 12, wherein the representation of the media file is a selectable object, and wherein the selectable object is associated with a title of the media file, and wherein the operation of causing display of the transmitted representation comprises causing display of the title of the media file within the sent message region of the second user interface.

14. The system of claim 12, wherein the representation of the media file is a selectable object, and wherein the operation of causing display of the transmitted representation comprises causing display of a pictorial representation of the selected media file clickable to activate the selected media file within the sent message region of the second user interface.

15. The system of claim 12, wherein the inserted representation of the selected media file within the message composition region of the first user interface differs from the display of the transmitted representation of the selected media file within the sent message region of the second user interface.

16. The system of claim 12, wherein the selected media file is a video, and wherein the embedded viewer is a video player, and wherein the embedded selectable controls comprise playback controls for the video.

17. The system of claim 12, wherein the representation of the media file is a link to the media file clickable to activate the media file within the message composition region of the first user interface.

18. The system of claim 12, the operations further comprising:

in response to the transmitting, causing display of the representation of the selected media file in a sent message region of the first user interface, the representation of the selected media file selectable within the sent message region of the first user interface to active the selected media file within the sent message region of the first user interface.

19. The system of claim 1, wherein the operation of transmitting the representation of the media file comprises:

receiving selection of a send command through the first user interface;

packaging the representation of the media file with other contents of the message composition region at the time of receiving the selection of the send command into a packaged message; and transmitting the packaged message to the second client device.

20. A system for delivering media files in a communication session between a plurality of participants, the system comprising:

means for causing display of a first user interface on a first client device of a first participant of the communication session, the first user interface comprising a message composition region defined within the first user interface for receiving input to compose messages for transmission in the communication session;

means for causing display of a second user interface on a second client device of a second participant of the communication session, the second user interface comprising a sent message region defined for displaying messages within the second user interface previously transmitted by participants of the communication session;

means for receiving a selection of a media file at the first client device;

means for inserting a representation of the selected media file into the message composition region, the representation associated with a network address of the selected media file;

means for transmitting the representation of the selected media file to the second client device of the second participant of the communication session;

means for causing display of the transmitted representation of the selected media file in the sent message region of the second user interface, wherein the displayed representation of the selected media file is selectable within the sent message region and is embedded with a control which, when invoked, activates the selected media file for viewing or playback within the sent message region of the second user interface; and means for in response to activating the selected media file within the sent message region, launching a viewer embedded within the sent message region of the second user interface, the embedded viewer comprising embedded selectable controls which, when activated, control viewing or playback of the media file within the second user interface.

* * * * *